April 26, 1955
R. A. PRIOR ET AL
2,707,261
MOTOR SPEED REDUCTION DEVICE
Filed Nov. 14, 1952
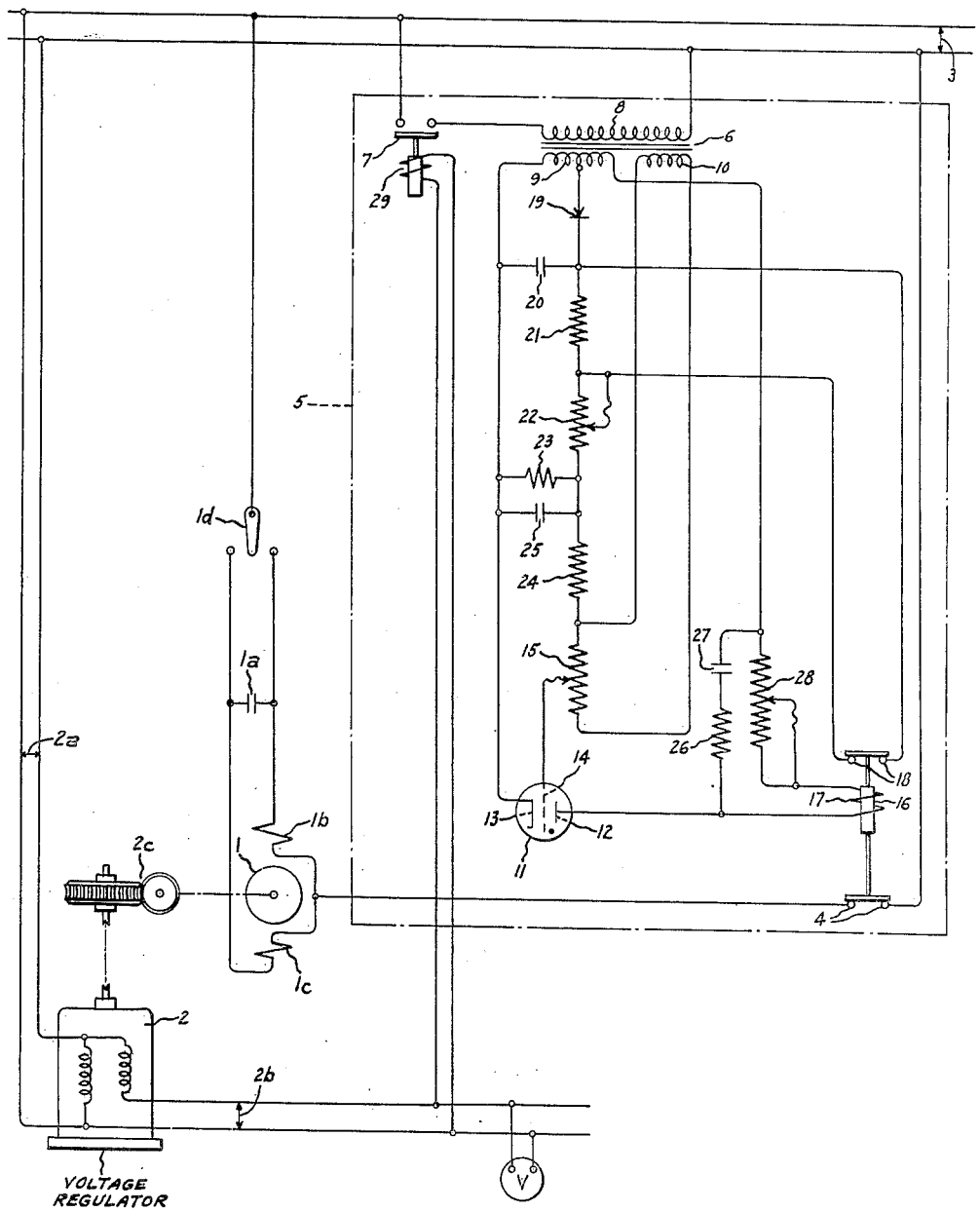
Inventors:
Roger A. Prior,
Morris T. Reese,
by *Gilbert P. Tarleton*
Their Attorney.

United States Patent Office 2,707,261
Patented Apr. 26, 1955

2,707,261

MOTOR SPEED REDUCTION DEVICE

Roger A. Prior and Morris T. Reese, Pittsfield, Mass., assignors to General Electric Company, a corporation of New York Application November 14, 1952, Serial No. 320,570

6 Claims. (Cl. 318—341)

This invention relates to speed control means and, more particularly, to an electronically-operated speed reduction device for an electric motor.

Heretofore when it has been desired to obtain a variable speed output from an electric motor normally having substantially fixed speed characteristics, as for example, a conventional capacitor-run alternating current motor, it has been the practice either to use an adjustable mechanical speed reduction device in combination with the motor or to use an electrical speed reduction device which required substantial modification of the structural components of the motor in order to be used therewith.

An object of the invention is to provide a new and improved speed reduction device which is relatively simple in construction.

Another object of the invention is to provide a new and improved electronically-operated speed reduction device which, when used in combination with an electric motor, requires substantially no modification of the structural components of the motor.

Another object of the invention is to provide an effective speed control means for an adjusting motor whereby the high motor speeds required for adjustments over large ranges may be rapidly reduced, so that fine adjustments may be carried out at a relatively low speed of motor operation.

In accordance with one aspect of the invention, effective speed control of an electric motor has been obtained by imparting controlled voltage impulses of predetermined frequency and duration to the motor. This has been accomplished by rapidly and intermittently interrupting and reclosing the power supply to the motor by means of a novel and simple electronically-operated speed reduction device, the use of which requires no modification of the structural components of the motor.

The invention will be better understood by considering the following description taken in connection with the accompanying drawing, and its scope will be pointed out in the appended claims.

The figure shown in the drawing is a schematic diagram of a device embodying the present invention.

Referring now to the drawing, there is shown a reversible electric motor, generally indicated at 1, operated from an alternating current source 3. This reversible motor may be of almost any conventional type although we have shown in the drawings a well-known capacitor-run alternating current motor having the usual capacitor 1a connected across windings 1b and 1c. The motor will operate in different directions of rotation depending upon the position of the normally-opened control switch 1d.

The motor 1 is shown, by way of example, as being used to adjust the voltage output of a conventional induction voltage regulator 2 having an input voltage indicated at 2a and output voltage indicated at 2b. Reduction gearing 2c interconnects the motor 1 and the regulator 2. The normally-closed relay contacts 4, which are located to open and close one of the motor supply lines, permit the adjusting motor to operate at normal speed until the speed reduction device shown generally at 5 is energized.

The speed reduction device includes a control supply transformer 6 which is adapted to be energized by closing a switch 7, which may be either manually operated or relay operated depending upon the particular application. Although the details of the transformer may be varied in a manner apparent to one skilled in this art, the control supply transformer 6 shown in the drawing has a primary winding 8 and two independent secondary windings 9 and 10. A unidirectional gaseous discharge tube is shown at 11. Although the tube may be either of the thyratron type or the cold cathode type, the cold cathode type is preferred since substantially instantaneous operation may be provided with this type of tube without the necessity of continuously energizing the tube, which results in stand-by losses and reduced tube life. This tube has an anode or plate 12, a cathode 13, and a starter or control grid 14. The output of secondary winding 9 is applied across the plate and cathode of tube 11. Unless the control grid 14 is at a sufficiently positive potential with respect to the cathode, the voltage from winding 9 which is applied from plate to cathode is of insufficient magnitude to cause the tube to fire or, as stated otherwise, to cause current to flow through the tube. The output of the other secondary winding 10 is applied to the potentiometer 15. A portion of the voltage applied to the potentiometer is applied to the starter or control grid 14 of the tube 11. The parts of the device are proportioned so that with the voltage from winding 9 applied from plate to cathode, the alternating voltage impressed upon the control grid by means of winding 10 and the potentiometer 15 is not of sufficient magnitude to fire the tube.

A relay 16 has a coil 17 which is connected in series with the plate 12 of tube 11. This relay coil 17 is adapted to operate the normally-closed relay contacts 4 thereby controlling the power supply to the motor 1. In addition, this relay coil 17 is adapted to operate the normally-closed relay contacts 18, the operation of which will be more fully explained hereinafter.

A unidirectional voltage may be applied to the control grid by means of a rectifier 19 connected to a point on transformer winding 9 and cooperating with a filter capacitor 20. The rectifier and its filter are connected to a resistor-capacitor network comprising resistors 21, 22, 23, and 24, and a capacitor 25. Adjustable resistor 22 is connected in series with the parallel combination of resistor 23 and capacitor 25. The normally-closed relay contacts 18 are connected in such a manner that the rectifier output normally by-passes resistor 21 and flows into adjustable resistor 22, which may be characterized as the "frequency control" rheostat. It should be noted that resistor 21 has a much greater resistance than the sum of the resistances of elements 22 and 23. Resistor 24 is used merely to limit the grid current.

When the speed reduction device is initially energized by switch 7, direct current flows through the frequency control rheostat 22 and builds up a voltage on capacitor 25, which causes an increasing unidirectional voltage to be built up on the control grid 14 of the tube 11. This increasing voltage is added to the alternating voltage from the potentiometer 15 until the sum of the two voltages on the control grid is sufficient to fire the tube. It should be noted that since the plate of the tube is energized by an alternating voltage, current will be conducted through the tube only during the half cycles when the plate 12 is positive.

A second resistor-capacitor network, which is connected to the plate 12, includes a resistor 26, an adjustable resistor 28, which may be termed the "pulse control" rheostat, and a capacitor 27. The relay coil 17 forms a series combination with the pulse control rheostat 28, and this series combination is connected in parallel with respect to the series combination of resistor 26 and capacitor 27.

The operation of the speed control device is as follows. When the switch 7 is closed, the transformer windings 9 and 10 are energized, causing an alternating voltage from winding 9 to be applied to the plate of tube 11, and a portion of the alternating voltage from winding 10 to be applied to the control grid 14 by means of potentiometer 15. As previously stated, the alternating voltage applied to the control grid 14 is insufficient to fire the tube. However, the closing of switch 7 has simultaneously caused a unidirectional voltage to be applied from the rectifier 19 to the frequency control rheostat 22 and the capacitor 25. As the capacitor 25 charges, an increasing unidirectional voltage is added to the alternating voltage on the control grid 14 of tube 11. When the sum of the alternating and unidirectional voltages applied to the control grid exceeds a predetermined level, the tube is caused to fire or conduct current therethrough. Since the plate is energized by an alternating voltage, current will be conducted only during half cycles when the plate is positive. The tube current charges the second resistor-capacitor network 26, 27, 28 until the voltage impressed upon the relay coil 17 is sufficient to actuate the relay and open contacts 4 and 18. During the period when the tube is conducting but before the relay 16 is actuated, the charge is increasing on capacitor 25 thereby increasing the sum of the alternating and unidirectional voltages applied to the control grid 14 of the tube 11. When the relay 16 is finally actuated and opens the normally-closed contacts 18, resistor 21 is added to the control grid circuit. This resistor 21 has a much greater magnitude than the sum of resistors 22 and 23. Thus, capacitor 25 begins to discharge through resistance 23 thereby reducing the unidirectional voltage applied to the control grid and thus reducing the period of current conduction through the tube 11 during each half cycle. After relay 16 is actuated, the capacitor 27 stores sufficient energy during tube conduction to maintain the relay in an actuated condition during the non-conducting half-cycles of the tube 11. As the period of tube conduction decreases in response to the decreasing voltage applied to the control grid, the energy available to maintain the relay 16 actuated is reduced until, finally, relay 16 is inactivated, resulting in closing of contacts 18 and 4. The device is then in a condition for the complete timing cycle to be reinitiated. As long as the switch 7 is closed this cycle will continue to repeat itself.

It should be noted that the effective reduced motor speed can be varied over a wide range by changing the adjustment of rheostats 22 and 28. For example, when the speed reduction device 5 is operating, the pulse control rheostat 28 determines the time that the relay 16 remains inoperative and, thus, the time that the motor 1 will be energized. This pulse control rheostat 28 determines this time period by establishing the voltage which must be developed across resistor 26 and capacitor 27 before the relay 16 is actuated. It should be further noted that the frequency control rheostat 22 determines the time period during which the relay 16 will be actuated and, thus, the time period during which the motor 1 will be deenergized. This frequency control resistor 22 determines this time period of motor deenergization by controlling the magnitude of the unidirectional voltage which will be built up on the control grid at the time relay 16 is actuated. Although adjustments of potentiometer 15 will affect the frequency control, such adjustments would normally be used only to adjust for manufacturing variations in the circuit components.

It might be further pointed out that, in the preferred embodiment of the invention, the alternating voltage applied to the control grid 14 of the tube 11 is in phase with the alternating voltage applied from winding 9 across the plate and cathode. This phase relationship produces desirable timing characteristics for the speed reduction device. It should be noted, however, that even if this phase relationship were changed, the device would still operate in substantially the same manner although the timing characteristics would be changed.

In certain applications where an electric motor is used for adjustment purposes, it is highly desirable to perform the adjusting operation in the shortest possible time. An example of such an application is in a motor-operated induction regulator which must be capable of providing widely divergent voltages of exact and predetermined magnitude with a minimum of delay. In order that these requirements may be effectively fulfilled, it is desirable that a low motor speed be provided for fine adjustments, so as to insure a maximum of accuracy, and that a high motor speed, insuring a minimum of delay, be provided for the large adjustments which are necessary to bring the adjusted device within the fine adjustment range. It is also important, in order to obtain rapid adjustments under these conditions, that the transition between high speed and low speed operation be as rapid as possible.

Our invention provides a means for effectively meeting all of the necessary requirements for the above type of motor operation. To illustrate this point, we have shown in the drawing a conventional induction voltage regulator 2 which may be adjusted to the desired output voltage by the adjusting motor 1. When the desired voltage, as indicated by the voltmeter V, is obtained, the adjusting motor 1 is stopped either by means of a manually operated switch or an automatically operated means, such as a relay-controlled switch. For the sake of simplicity, we have shown a manually operated switch 1d.

Thus, the operation of the motor control means may be summarized as follows: When a voltage output differing widely from the original output of the regulator 2 is desired, the motor 1 is energized for high speed operation by the switch 1d. When the regulator has been adjusted at high speed over the intervening wide range of adjustment and to a degree of adjustment relatively close to the final voltage desired, the relay 29 which is preset in a suitable manner so as to become actuated at this degree of adjustment, operates the switch 7, thereby rapidly reducing the effective motor speed through the intermittent opening and closing of relay contacts 4. This reduced motor speed lends itself to accurate control, and as soon as the desired voltage, as indicated on the voltmeter V, is obtained, the adjusting motor 1 may be stopped by opening switch 1d.

Although we have shown the energizing switch 7 for the speed reduction device 5 as being operated in response to variations in the voltage output of the regulator 2, it should be apparent that this switch could be operated in response to any output function controlled by the regulator, for example, current or heat.

While there have been shown and described a particular embodiment of the invention, it will be obvious to those skilled in the art that changes and modifications may be made without departing from the invention, and that it is intended by the appended claims to cover all such changes and modifications as fall within the true spirit and scope of the invention.

What we claim as new and desire to secure by Letters Patent of the United States is:

1. Means for operating a motor at variable speeds by imparting to the motor controlled power impulses of predetermined frequency and duration, said operating means comprising: a power circuit for supplying power to said motor, means for rapidly interrupting and closing said power circuit so as to permit said controlled power impulses to be imparted to said motor, said interrupting means comprising a control circuit including a relay having a coil and a gaseous discharge tube having a plate and a control grid, said relay coil being connected in circuit with said plate and having its operation responsive to current flow through said tube, a resistor-capacitor network in the circuit of said control grid for building up a potential on said control grid as the capacitor of said network is charged, a current limiting resistor in the circuit of said control grid, a by-pass circuit around said current limiting resistor through normally closed contacts of said relay, said control grid causing the tube to conduct only when the grid potential is built up to a predetermined point, said relay breaking the current limiting resistor by-pass circuit upon being energized so as to control the potential on said control grid in response to current flow through the tube, said relay having additional normally closed contacts which open said power circuit when said relay is energized and reclose said power circuit when said relay is de-energized.

2. A speed varying device for reducing the speed of a motor by intermittent interruption of the power supply to the motor, said device comprising: an alternating current source supplying a motor-control relay connected to the plate of a gaseous discharge tube having a control grid, the operation of said relay being responsive to current flow through said tube, an alternating voltage impressed upon said control grid, said alternating voltage being of insufficient magnitude to cause current to flow in the tube, a unidirectional rectified biasing voltage upon which said alternating voltage is superimposed, means comprising a resistor-capacitor network connected to said control grid for providing a build-up means whereby the unidirectional voltage can be increased to a point at which the sum of the alternating and unidirectional voltages on the grid is sufficient to cause current to flow in the tube, said relay upon actuation in response to tube current causing the unidirectional grid potential, after a predetermined time period, to be decreased to a point at which the plate current through the tube is insufficient to maintain said relay actuated whereby said relay is inactivated, the operation of said relay being adapted to control the interruption and closing of said power supply to the motor.

3. An alternating current power control device comprising; a gaseous discharge tube having a plate and a control grid; a relay; a transformer having a first and second secondary winding; a circuit connecting the first secondary winding, gaseous discharge tube and relay for energizing said relay when said gaseous discharge tube becomes conducting; a circuit connecting the second secondary winding of said transformer to the control grid of said tube; a rectifier; a circuit including a center tap connection to said first secondary winding connecting said rectifier to said control grid; means for varying the strength of the signal through said rectifier whereby said tube becomes conducting when the control signal attains a predetermined level; and two normally closed contacts on said relay one of which is opened to break a power circuit when said relay is energized and the other of which is opened to decrease the control signal strength through said rectifier when said relay is energized.

4. An alternating current power control device comprising: a gaseous discharge tube having a plate and a control grid; a relay; a transformer; a circuit connecting said transformer, tube and relay whereby said relay is energized when said tube becomes conducting; means for maintaining said relay energized for a brief interval after said tube ceases to conduct; a rectifier; a circuit connecting said transformer to the control grid of said tube through said rectifier; a resistance-capacitor network in the rectifier-control grid circuit for building up a potential on said grid as the capacitor of said network is charged; means for setting the level to which said grid is charged to produce conduction through said tube; and a normally closed contact on said relay which is opened upon energization of said relay to break a power circuit.

5. A device as claimed in claim 4 wherein the gaseous discharge tube is of the cold cathode type.

6. A speed control device for reducing the speed of a motor by rapidly and intermittently opening and closing the power supply to said motor, said speed control device comprising: a relay with two normally closed contacts which are opened upon energization of said relay one of which breaks a motor operating circuit; a gaseous discharge tube having a plate and a control grid, said tube becoming conducting when said grid is provided with a particular level of positive potential; a circuit connecting said tube to said relay whereby said relay is energized when said tube becomes conducting; a first resistance-capacitor network in said relay energizing circuit whereby said relay is kept energized for a brief interval after said tube has ceased to conduct; a unidirectional rectifier; a grid control circuit connecting said rectifier to the control grid; and a second resistance-capacitor network electrically connected to said grid control circuit and said relay energizing circuit whereby a potential is built up on said grid as the capacitor of said network is charged, said control grid causing the tube to conduct current only when the grid potential is built up to a predetermined level, said second resistance-capacitor network including a grid current limiting resistor which is normally by-passed through the other of said relay contacts but which is included in the grid control circuit upon energization of said relay whereby the potential on said control grid decreases in response to energization of said relay.

References Cited in the file of this patent

UNITED STATES PATENTS

| | | |
|---|---|---|
| 2,431,284 | Stadum | Nov. 18, 1947 |
| 2,530,749 | Yardeny et al. | Nov. 21, 1950 |
| 2,542,264 | Smith | Feb. 20, 1951 |
| 2,583,792 | Nelson | Jan. 29, 1952 |